United States Patent
Matsumoto et al.

(10) Patent No.: US 10,007,851 B2
(45) Date of Patent: Jun. 26, 2018

(54) MONITORING DEVICE, MONITORING SYSTEM AND MONITORING METHOD

(71) Applicant: PANASONIC INTELLECTUAL PROPERTY MANAGEMENT CO., LTD., Osaka (JP)

(72) Inventors: Yuichi Matsumoto, Kanagawa (JP); Kazuma Yoshida, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 194 days.

(21) Appl. No.: 14/808,236

(22) Filed: Jul. 24, 2015

(65) Prior Publication Data

US 2016/0026875 A1    Jan. 28, 2016

(30) Foreign Application Priority Data

Jul. 28, 2014 (JP) ................................ 2014-152561

(51) Int. Cl.
| | |
|---|---|
| *H04N 7/18* | (2006.01) |
| *G06K 9/00* | (2006.01) |
| *H04N 5/247* | (2006.01) |
| *H04N 5/232* | (2006.01) |
| *G08B 13/196* | (2006.01) |
| *H04N 21/2343* | (2011.01) |
| *H04N 21/218* | (2011.01) |

(Continued)

(52) U.S. Cl.
CPC ... *G06K 9/00771* (2013.01); *G08B 13/19686* (2013.01); *H04N 5/23229* (2013.01); *H04N 5/247* (2013.01); *H04N 21/21805* (2013.01); *H04N 21/2343* (2013.01); *H04N 21/23418* (2013.01); *H04N 21/25866* (2013.01); *H04N 21/25875* (2013.01); *H04N 21/4545* (2013.01); *G06Q 30/02* (2013.01)

(58) Field of Classification Search
None
See application file for complete search history.

(56) References Cited

U.S. PATENT DOCUMENTS

| | | |
|---|---|---|
| 2004/0036767 A1 | 2/2004 | Yajima |
| 2009/0066802 A1 | 3/2009 | Itagaki |

(Continued)

FOREIGN PATENT DOCUMENTS

| | | |
|---|---|---|
| EP | 1519569 | 3/2005 |
| JP | 2000-324445 | 11/2000 |

(Continued)

OTHER PUBLICATIONS

The Extended European Search Report dated Dec. 22, 2015 for the related European Patent Application No. 15170991.2

*Primary Examiner* — Heather Jones
(74) *Attorney, Agent, or Firm* — Greenblum & Bernstein, P.L.C.

(57) ABSTRACT

A monitoring device according to an embodiment of the present invention controls a moving image processor and a moving image outputter according to the use purpose of a user, and outputs one of an original video and a mask processing image. A controller causes the moving image processor to perform a prescribed preprocessing according to a prescribed start event generated in advance of a use purpose input operation which is performed by the user.

12 Claims, 12 Drawing Sheets

(51) Int. Cl.
*H04N 21/234* (2011.01)
*H04N 21/258* (2011.01)
*H04N 21/4545* (2011.01)
*G06Q 30/02* (2012.01)

(56) References Cited

U.S. PATENT DOCUMENTS

2009/0204370 A1 8/2009 Chu et al.
2012/0293654 A1 11/2012 Ikegami
2013/0004090 A1* 1/2013 Kundu .................. G07F 19/207
  382/232

FOREIGN PATENT DOCUMENTS

| JP | 2004-080669 | 3/2004 |
| JP | 2005-286468 A | 10/2005 |
| JP | 4236785 | 12/2008 |
| JP | 2009-064228 | 3/2009 |
| JP | 2009-187554 | 8/2009 |
| JP | 2012-244300 | 12/2012 |

\* cited by examiner

MONITORING DEVICE, MONITORING SYSTEM AND MONITORING METHOD

BACKGROUND

1. Field of the Invention

The present invention relates to a monitoring device, a monitoring system and a monitoring method, which generate a mask processing image, obtained (acquired) by changing the image area of a movable body of the video (moving image) in a monitoring area into a mask image, and which output one of an original video and a mask processing image according to the use purpose of a user.

2. Description of the Related Art

In a store, such as a convenience store, a monitoring system is widely spread which monitors a situation in the store using the video of cameras by installing the cameras for capturing inside the store. However, it is necessary to secure the privacy of customers when the video is used for a purpose of customer behavior analysis, in which the behaviors of the customers in the store are analyzed, in order to improve the management of the store, that is, in order to improve a customer satisfaction level or to effectively manage the store in addition to the purpose of monitoring for crime prevention and disaster prevention.

With regard to a request for the privacy of customers to be secured, a technology that performs a mask processing (concealment processing) of changing a person area in a video captured by cameras into a specific mask image is known in the related art (refer to Japanese Patent No. 4236785). More specifically, in the technology, it is recognized whether or not a user who browses the video has authority for browsing an unprocessed video on which the mask processing is not performed, the unprocessed video is distributed to a user who has the authority for browsing the unprocessed video, that is, a user who has a use purpose of monitoring for crime prevention and disaster prevention, a video on which the mask processing is performed is distributed to a user who does not have the authority for browsing the unprocessed video, that is, a user who does not have the use purpose of monitoring, for example, a user who has a use purpose of understanding the degree of congestion in a restaurant, and the original video and the mask processing image are output in a switching manner according to the use purpose of the user.

Further, the mask processing has a large amount of operational load, and time is required from when the mask processing starts to when an appropriate mask-processed image is output. In addition, although it is not limited to the mask processing, when a background image in which a person is not reflected is necessary in a video processing using a background difference manner, the background image is generated from a video (frames) during a prescribed learning period. However, in order to generate an appropriate background image, it is necessary to sufficiently secure a long learning period. Therefore, it is difficult to immediately display an appropriate mask processing image when the display of video starts, and thus display delay occurs.

In the related art, such a problem is not taken into consideration. That is, in the related art, the original video and the mask processing image are output in a switching manner according to the use purpose of the user. However, in this case, the user starts the mask processing after the use purpose input operation is performed. Therefore, the mask processing is late for timing in which the display of video starts, with the result that the display delay occurs when the display of video starts, and thus there is a technical problem in that the user feels slowness on the process and it is difficult to obtain an expected feeling of use of the user.

More specifically, in recent years, opportunities, in which the video of cameras is used for purposes other than monitoring for crime prevention and disaster prevention, that is, the customer behavior analysis in order to improve the management of a store, have increased compared to the use of a video for the purpose of the monitoring, the importance of use of the video for the purposes other than the monitoring increases, and thus it is desired to provide a technology which is capable of obtaining an expected feeling of use of the user regardless of the use purpose.

SUMMARY

According to an embodiment of the present invention, there is provided a monitoring device, which generates a mask processing image, obtained by changing an image area of a movable body of a video in a monitoring area into a mask image, and which outputs one of an original video and the mask processing image according to a use purpose of a user, the monitoring device including: a processor; a memory that stores instructions; a use purpose acquirer that obtains the use purpose of the user according to an input operation performed by the user; a moving image processor that generates the mask processing image by performing a mask processing of changing the entirety or a part of the image area of the movable body of the video into the mask image; a moving image outputter that selectively outputs the video and the mask processing image; and a controller that controls the moving image processor and the moving image outputter according to the use purpose of the user, and outputs one of the original video and the mask processing image, in which the use purpose acquirer, the moving image processor, the moving image outputter, and the controller correspond to the instructions which are stored in the memory and performed by the processor, and the controller causes the moving image processor to start a prescribed preprocessing according to a prescribed start event generated in advance of the use purpose input operation, which is performed by the user.

DETAILED DESCRIPTION OF THE PREFERRED EMBODIMENTS

Figure 1:
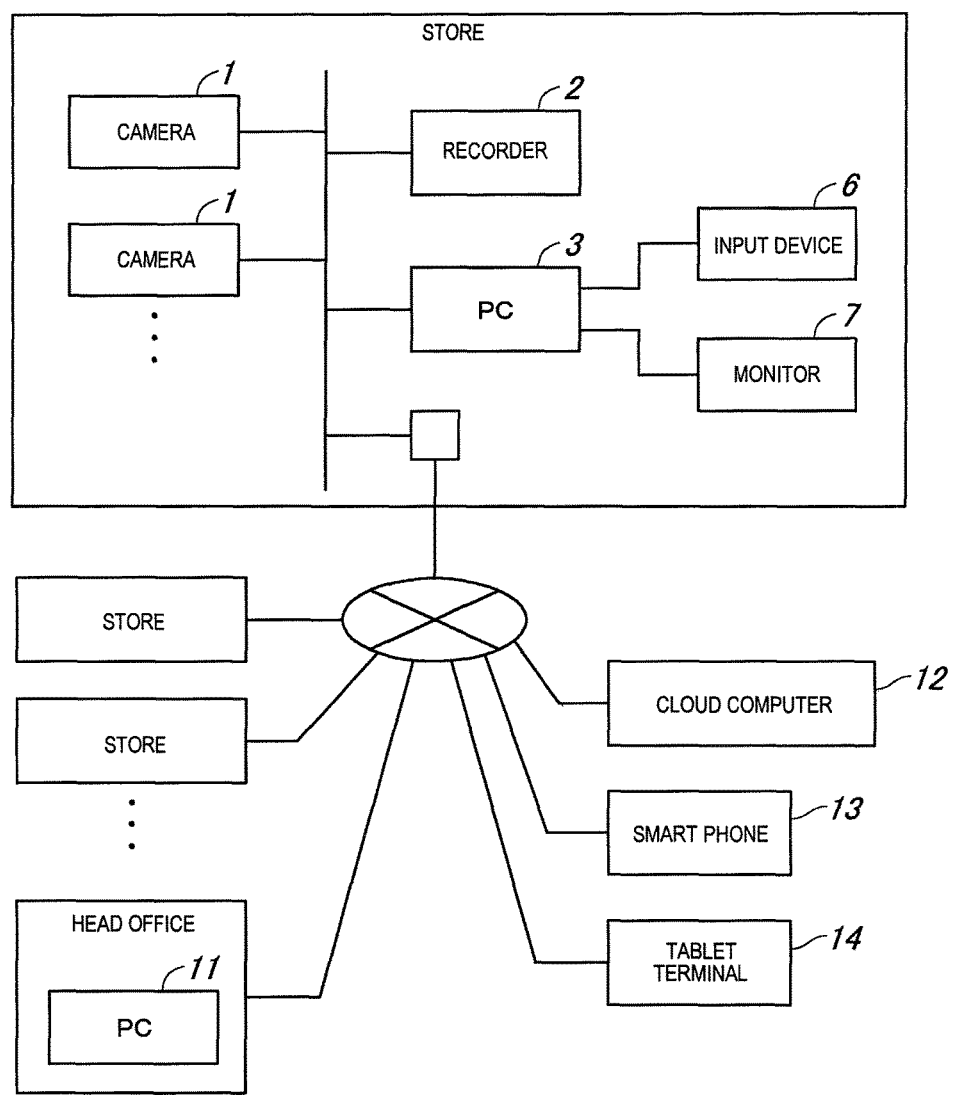
FIG. 1 is a diagram illustrating the whole configuration of a monitoring system according to a first embodiment.

A main object of the present invention is to provide a monitoring device, a monitoring system and a monitoring method which are capable of immediately displaying an appropriate video according to use purpose after a user performs a use purpose input operation, regardless of the use purpose.

According to a first aspect of the invention, a monitoring device generates a mask processing image, obtained by changing an image area of a movable body of a video in a monitoring area into a mask image, and outputs one of an original video and the mask processing image according to a use purpose of a user. The monitoring device includes a processor; a memory that stores instructions; a use purpose acquirer that obtains the use purpose of the user according to an input operation performed by the user; a moving image processor that generates the mask processing image by performing a mask processing of changing the entirety or a part of the image area of the movable body of the video into the mask image; a moving image outputter that selectively outputs the video and the mask processing image; and a controller that controls the moving image processor and the moving image outputter according to the use purpose of the user, and outputs one of the original video and the mask processing image. The use purpose acquirer, the moving image processor, the moving image outputter, and the controller correspond to the instructions which are stored in the memory and performed by the processor, and the controller causes the moving image processor to start a prescribed preprocessing according to a prescribed start event generated in advance of the use purpose input operation, which is performed by the user.

According to this, a moving image processor is caused to start a prescribed preprocessing according to a prescribed start event without a use purpose input operation performed by a user, and thus it is possible to eliminate display delay which is generated when the display of video starts. Therefore, after the user performs the use purpose input operation, it is possible to immediately display an appropriate video according to the use purpose regardless of the use purpose.

According to a second aspect of the invention, in the monitoring device, if the use purpose input operation is performed by the user, the controller continues the preprocessing when the use purpose of the user requires the mask processing, and ends the preprocessing when the use purpose of the user does not require the mask processing.

According to this, when the use purpose of the user does not require a mask processing, the preprocessing ends, and thus it is possible to prevent the load of a device from increasing due to useless processing.

According to a third aspect of the invention, in the monitoring device, the moving image processor includes: a background image generator that generates a background image from the video during a nearest prescribed learning period; a moving object area acquirer that obtains position information of the image area of the movable body of the video based on the video and the background image; a mask image generator that generates the mask image corresponding to the image area of the movable body; and a mask processing image generator that generates the mask processing image by superimposing the mask image on the background image. The controller causes the background image generator to start a background image generating processing as the preprocessing according to the start event.

According to this, it is possible to precisely obtain the position information of the image area of a movable body by generating a background image from the nearest video based on the fact that the video momentarily changes according to the change in light from outside, and thus it is possible to generate an appropriate mask processing image. Further, in order to generate the appropriate background image using a background image generating processing, it is necessary to secure a sufficiently long learning period, and thus the display delay, which is generated when the display of video starts, is remarkable. However, it is possible to eliminate display delay by starting a background image processing as the preprocessing.

According to a fourth aspect of the invention, in the monitoring device, the controller causes the moving image processor to start the preprocessing according to activation of the device as the start event.

According to this, it is possible to secure time from when the device is activated to when the user performs the use purpose input operation, and thus it is possible to eliminate the display delay which is generated when the display of video starts.

According to a fifth aspect of the invention, the monitoring device further includes a user authenticator that performs user authentication. The controller causes the moving image processor to start the preprocessing according to completion of the user authentication performed in the user authenticator as the start event.

According to this, it is possible to secure time from when user authentication is performed to when the user performs the use purpose input operation, and thus it is possible to eliminate the display delay which is generated when the display of video starts.

According to a sixth aspect of the invention, the monitoring device further includes a user authenticator that performs user authentication. The controller performs control such that the processing performed by the use purpose acquirer is omitted when the use purpose of the user, which is authenticated by the user authenticator, is limited to one purpose.

According to this, the use purpose input operation, which is performed by the user, is omitted, and thus it is possible to increase the convenience of the user.

According to a seventh aspect of the invention, a monitoring system generates a mask processing image, obtained by changing an image area of a movable body of a video in a monitoring area into a mask image, and outputs one of an original video and the mask processing image according to a use purpose of a user. The monitoring system includes: a camera that captures the monitoring area; and a plurality of information processing devices. Any one of the plurality of information processing devices includes a processor; and a memory that stores instructions; a use purpose acquirer that obtains the use purpose of the user according to an input operation performed by the user; a moving image processor that generates the mask processing image by performing a mask processing of changing the entirety or a part of the image area of the movable body of the video into the mask image; a moving image outputter that selectively outputs the video and the mask processing image; and a controller that controls the moving image processor and the moving image outputter according to the use purpose of the user, and outputs one of the original video and the mask processing image. The use purpose acquirer, the moving image processor, the moving image outputter, and the controller correspond to the instructions which are stored in the memory and performed by the processor. The controller causes the moving image processor to start a prescribed preprocessing according to a prescribed start event generated in advance of the use purpose input operation, which is performed by the user.

According to this, similarly to the first embodiment of the present invention, after the user performs the use purpose input operation, it is possible to immediately display an appropriate video according to the use purpose regardless of the use purpose.

According to an eighth aspect of the invention, a monitoring system generates a mask processing image, obtained by changing an image area of a movable body of a video in a monitoring area into a mask image, and outputs one of an original video and the mask processing image according to a use purpose of a user. The monitoring system includes a camera that captures the monitoring area, and an information processing device that includes a processor; and a memory that stores instructions. The information processing device includes a use purpose acquirer that obtains the use purpose of the user according to an input operation performed by the user. The camera includes a moving image processor that generates the mask processing image by performing a mask processing of changing the entirety or a part of the image area of the movable body of the video into the mask image; a moving image outputter that selectively outputs the video and the mask processing image; and a controller that controls the moving image processor and the moving image outputter according to the use purpose of the user, and outputs one of the original video and the mask processing image. The controller causes the moving image processor to start a prescribed preprocessing according to a prescribed start event generated in advance of the use purpose input operation, which is performed by the user.

According to this, similarly to the first embodiment of the present invention, after the user performs the use purpose input operation, it is possible to immediately display an appropriate video according to the use purpose regardless of the use purpose.

According to a ninth aspect of the invention, in the monitoring system, the controller causes the moving image processor to start the preprocessing according to activation of the camera as the start event.

According to this, it is possible to secure the time until when the user performs the use purpose input operation after the camera is activated, and thus it is possible to eliminate the display delay which is generated when the display of video starts.

According to a tenth aspect of the invention, a monitoring method causes an information processing device to perform a processing of generating a mask processing image, obtained by changing an image area of a movable body of a video in a monitoring area into a mask image, and outputting one of an original video and the mask processing image according to a use purpose of a user. The monitoring method includes a step of obtaining the use purpose of the user according to an input operation performed by the user; a step of generating the mask processing image by performing a mask processing of changing entirety or a part of the image area of the movable body of the video into the mask image; a step of outputting one of the original video and the mask processing image according to the use purpose of the user; and a step of starting a prescribed preprocessing relevant to a mask processing image generating processing according to a prescribed start event generated in advance of the use purpose input operation which is performed by the user. The respective steps correspond to instructions which are stored in a memory and which are performed by a processor of the information processing device.

According to this, similarly to the first embodiment of the present invention, after the user performs the use purpose input operation, it is possible to immediately display an appropriate video according to the use purpose regardless of the use purpose.

According to an eleventh aspect of the invention, in the monitoring method, the respective steps are performed by a monitoring application program which is introduced in the information processing device, and the preprocessing starts according to activation of the application program as the start event.

According to this, it is possible to secure the time until when the user performs the use purpose input operation after the application program is activated, and thus it is possible to eliminate the display delay which is generated when the display of video starts.

Hereinafter, embodiments of the present invention will be described with reference to the accompanying drawings.

First Embodiment

FIG. 1 is a block diagram illustrating the whole configuration of a monitoring system according to a first embodiment. The monitoring system is constructed for a chain of retail stores, such as a convenience store, and includes cameras 1, recorder (video accumulating device) 2, and PC (monitoring device) 3.

Cameras 1 are installed at proper spots in a store (facility), the inside of the store is imaged by cameras 1, and video, which is obtained by the cameras, is accumulated in recorder 2.

In PC 3, input device 6, such as a mouse, which is used when a user, such as a store manager, performs various input operations, is connected to monitor (display device) 7 which is used to display a monitoring screen. PC 3 is installed in a proper place in the store, and enables the user to monitor the video in the store, which is captured by cameras 1 in real time using the monitoring screen which is displayed on monitor 7. In addition, PC 3 enables the user to browse past video in the store which is recorded in recorder 2.

In addition, cameras 1, recorder 2, and PC 3 are installed in each of a plurality of stores. PC 11 is installed in a head office which generalizes the plurality of stores. In PC 11, it is possible to browse the video in the store, which is captured by cameras 1, in real time. In addition, it is possible to browse the past video in the store which is recorded in recorder 2. Therefore, it is possible to recognize a situation in the store at the head office.

In the embodiment, PC 3, which is installed in the store, is constructed as a monitoring device which monitors the state of a person or a product in the store. It is possible for a user at the side of the store, for example, the store manager, to browse monitoring information, which is generated by PC 3, using PC 3. Further, the monitoring information is transmitted to PC 11, which is installed in the head office. Therefore, in PC 11, it is possible for a user at the side of the head office, for example, a local manager (supervisor or the like) who performs instruction or suggestion to each local store in his or her charge to browse the monitoring information. PCs 3 and 11 are constructed as browsing devices which browse the monitoring information.

Figure 2:
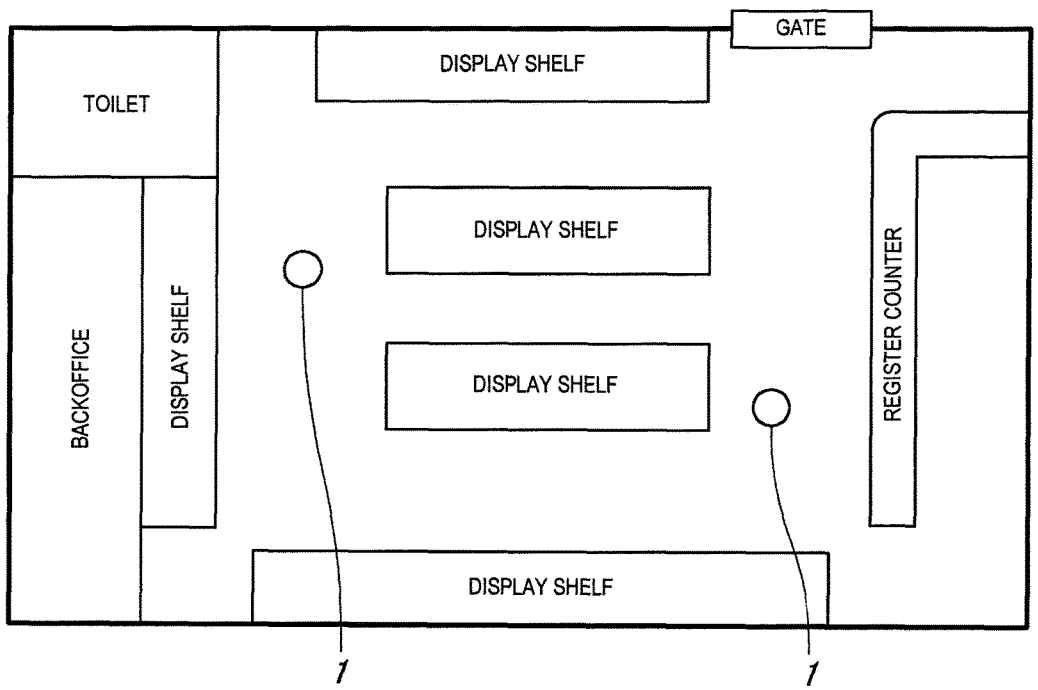
FIG. 2 is a plan view illustrating the layout of a store and the installation status of cameras.

Subsequently, the layout of the store and the installation status of cameras 1 will be described. FIG. 2 is a plan view illustrating the layout of the store and the installation status of cameras 1.

In the store, a gate, display shelves, a register counter, and the like are installed. The display shelves are installed while being classified as the types of the products such as lunch boxes, plastic bottles, and rice balls. A customer enters the store from the gate, and moves in the store through a passage between the display shelves. When the customer finds a desired product, the customer heads to the register counter with the product, and leaves the store from the gate after paying the charge (paying the price) at the register counter.

In addition, in the store, a plurality of cameras 1 which capture the inside (monitoring area) of the store are installed. The cameras are installed in appropriate positions of a ceiling in the store. In particular, in examples shown in FIG. 2, omnidirectional cameras, which include 360-degree capturing ranges using fish-eye lenses, are used as cameras 1, and thus it is possible to capture a person who goes in and out the store from the gate or a person who stays in the store using cameras 1.

Figure 3:
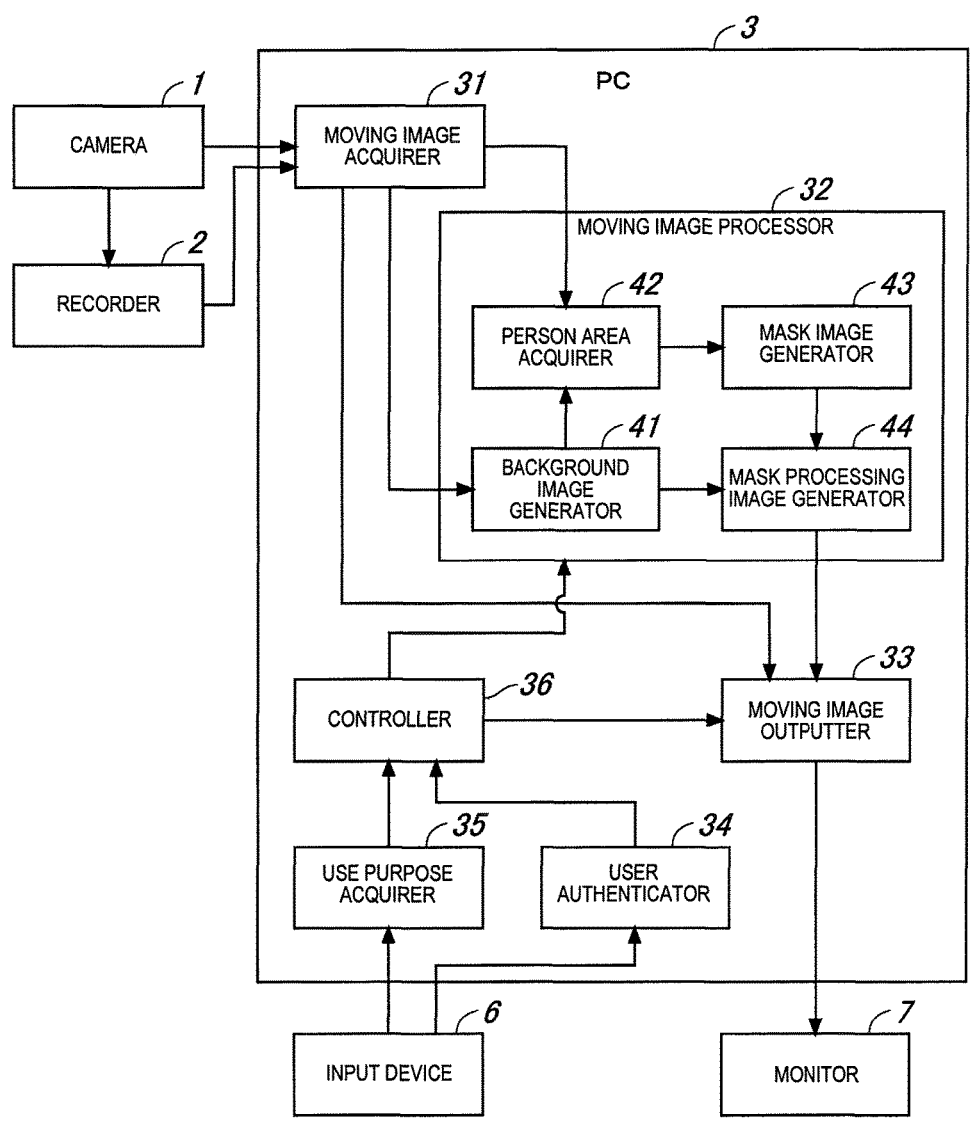
FIG. 3 is a functional block diagram illustrating the schematic configuration of a PC.

Subsequently, a monitoring processing, which is performed in PC 3 shown in FIG. 1, will be described. FIG. 3 is a functional block diagram illustrating the schematic configuration of PC 3.

PC 3 includes moving image acquirer 31, moving image processor 32, moving image outputter 33, user authenticator 34, use purpose acquirer 35, and controller 36.

Moving image acquirer 31 obtains video, which is obtained by capturing the inside of the store using cameras 1, from cameras 1 or recorder 2. Here, when current video is displayed in real time, video is obtained from cameras 1. When past video is displayed, video is obtained from recorder 2.

Moving image processor 32 generates mask processing image by performing a mask processing of changing the image area of a person in the video into a mask image, and includes background image generator 41, person area acquirer (moving object area acquirer) 42, mask image generator 43, and mask processing image generator 44.

Background image generator 41 performs a background image generating processing from the video obtained by moving image acquirer 31. In this process, the background image is generated from a plurality of video (frames) during a nearest prescribed learning period, and the background image is sequentially updated according to the acquisition of new video (frames). Well-known techniques may be used for the processing which is performed in background image generator 41.

Person area acquirer 42 performs a processing of obtaining the position information of an image area of a person which is present in the video based on the video which is obtained by moving image acquirer 31 and the background image which is generated by background image generator 41. In this process, the image area (foreground area) of the person is specified based on the difference between the video at a noticed time (current time in a real-time process) and the background image which is obtained during the earlier learning period. Meanwhile, well-known techniques may be used for the processing which is performed by person area acquirer 42.

Meanwhile, the background image according to the embodiment includes a so-called "background model". Background image generator 41 constructs the background model from a plurality of images during the learning period. Person area acquirer 42 compares the video at the noticed time with the background model, performs division into the foreground area and the background area, and obtains the position information of the image area of the person.

Mask image generator 43 performs a processing of generating a mask image corresponding to the image area of the person based on the position information of the image area of the person, which is obtained by person area acquirer 42. Meanwhile, the mask image may be generated to correspond to the entire image area of the person and may be generated to correspond to a part of the image area of the person. That is, from the point of view of privacy protection, an image area which is necessary to be hidden, for example, only the image area of a face may be covered by the mask image.

Meanwhile, although the display elements of the mask image, for example, display elements such as colors, gradation, patterns (shapes), and contour lines, may be previously set, the user may be enabled to appropriately select the display elements of the mask image.

Mask processing image generator 44 performs a processing of generating a mask processing image by superimposing the mask image, which is generated by mask image generator 43, on the background image which is generated by background image generator 41. In the embodiment, the mask image is superimposed on the background image in a transmissible state, and the background image is seen through the mask processing image.

Moving image outputter 33 performs a processing of selectively outputting an original video, which is obtained by moving image acquirer 31, and the mask processing image, which is generated by moving image processor 32, according to an instruction from controller 36.

User authenticator 34 performs a processing of validating user authentication, that is, validating whether or not a person who uses the device has legal authority. In the embodiment, when a monitoring application program is activated, a user authentication screen is displayed on monitor 7, the user is caused to input password on the user authentication screen using input device 6, such as a keyboard, and user authentication is performed using the password.

Meanwhile, in the embodiment, the user authentication is performed using the password which is input by the user. However, it is possible to use well-known various user authentication methods. For example, card authentication using an IC card, such as an employee card, or biometric authentication, such as fingerprint authentication, may be performed.

Use purpose acquirer 35 performs a processing of obtaining the use purpose of the user according to an input operation performed by the user. In the embodiment, a use purpose selection screen (refer to FIGS. 6A, 6B, and 6C) is displayed on monitor 7, and the user is caused to select the use purpose on the use purpose selection screen using input device 6, such as a mouse, thereby obtaining the use purpose of the user. In addition, in the embodiment, it is possible to select one of selling space monitoring and customer behavior analysis as the use purpose. The selling space monitoring corresponds to a case in which the situation of the selling space is monitored for crime prevention or disaster prevention, and the customer behavior analysis corresponds to a case in which the behaviors of customers in the store are analyzed for the improvement of a customer satisfaction level or effective management of the store.

Controller 36 controls each of the units of PC 3. More specifically, controller 36 instructs moving image processor 32 to start a necessary processing or to end a processing which is being executed, and instructs moving image outputter 33 to output one of the original video and the mask processing image. In the embodiment, controller 36 instructs moving image processor 32 to start prescribed preprocessing according to a prescribed start event which is generated in advance of the use purpose input operation, which is performed by the user. In addition, in the embodiment, controller 36 instructs moving image outputter 33 to output one of the original video and the mask processing image by controlling moving image processor 32 and moving image outputter 33 according to the use purpose of the user which is obtained by use purpose acquirer 35. The control, which is performed by controller 36, will be described later in detail.

Meanwhile, PC 3 shown in FIG. 3 includes a processor (CPU) and a program memory. Each of the units of PC 3 is realized by executing a monitoring (video browsing) application program (instruction) using the CPU of PC 3. The program may be previously introduced in PC 3 as the information processing device and be formed as a dedicated device. Further, the program may be recorded in an appropriate program recording medium as an application program which operates on a general-purpose OS and may be provided to the user through a network.

Subsequently, the outline of control which is performed by controller 36 shown in FIG. 3 will be described. FIGS. 4A and 4B and FIGS. 5A and 5B are sequence diagrams illustrating the outline of control which is performed by controller 36.

In the embodiment, controller 36 performs control such that moving image processor 32 performs a prescribed preprocessing according to the prescribed start event generated in advance of the use purpose input operation, which is performed by the user. More specifically, in the embodiment, background image generator 41 of moving image processor 32 is caused to start a background image generating processing as the preprocessing according to the start event. Further, when the use purpose input operation, which is performed by the user, is performed, and when the use purpose of the user requires the mask processing, the preprocessing is continued. When the use purpose of the user does not require the mask processing, the preprocessing ends.

In addition, in the embodiment, it is possible to set any one of events, that is, the activation of the monitoring application program, the completion (success) of the user authentication, the activation of cameras 1, and the activation of PC 3, to the start event.

Figure 4A:
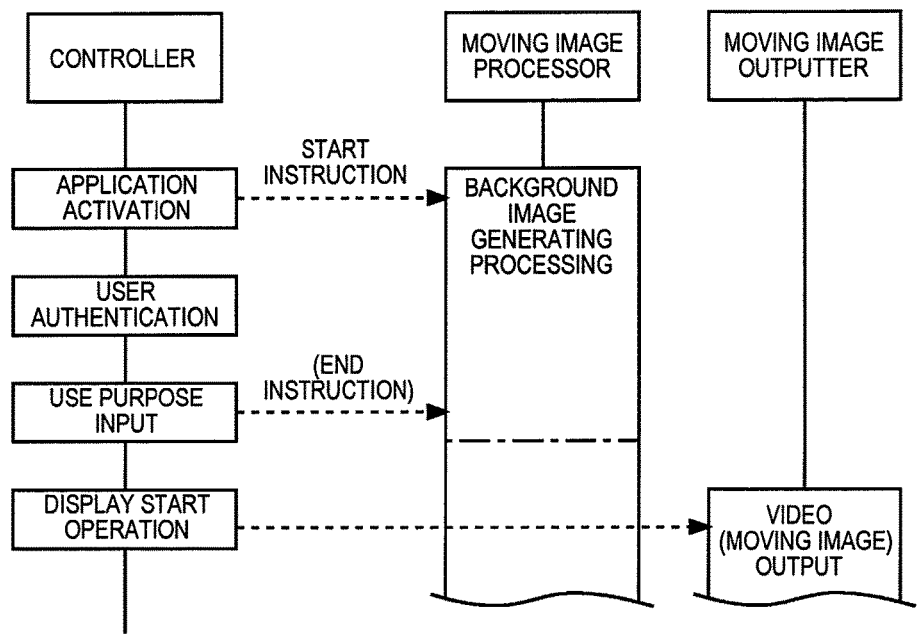
FIGS. 4A and 4B are sequence diagrams illustrating the outline of control which is performed by a controller.

FIG. 4A illustrates a case in which the activation of the monitoring application program is set to the start event. When the monitoring application program is activated, controller 36 instructs moving image processor 32 to start the background image generating processing. Accordingly, moving image processor 32 starts the background image generating processing.

Figure 4B:
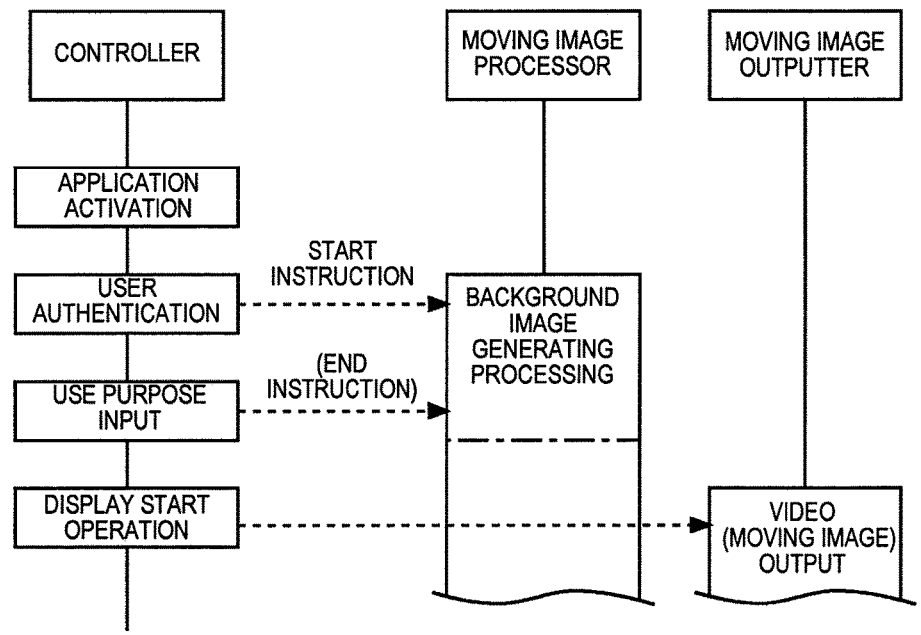

FIG. 4B illustrates a case in which the completion of the user authentication which is performed by user authenticator 34 is set to the start event. When the user authentication is completed, controller 36 instructs moving image processor 32 to start the background image generating processing. Accordingly, moving image processor 32 starts the background image generating processing.

Figure 5A:
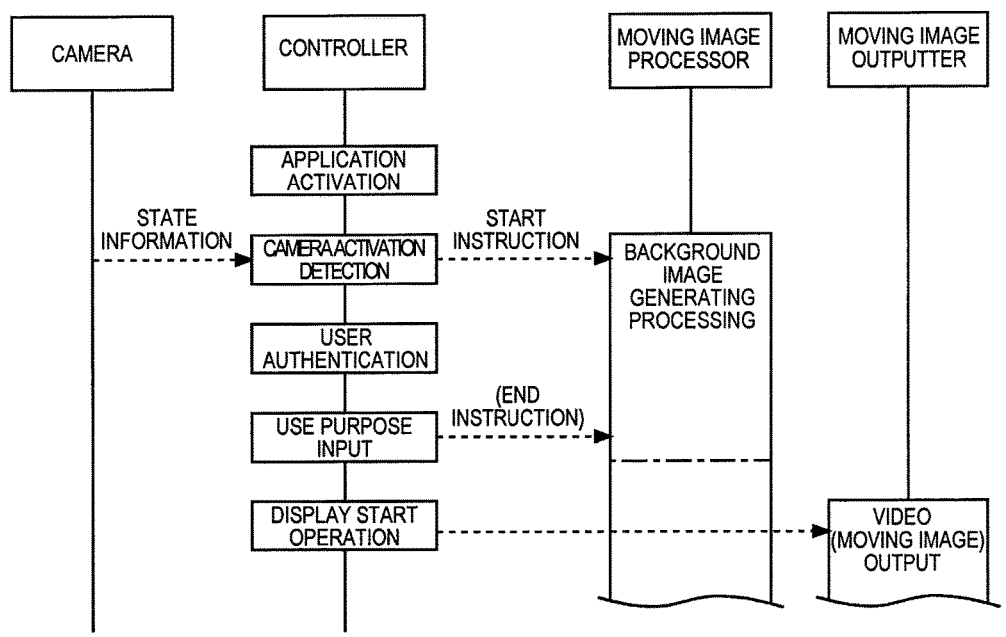
FIGS. 5A and 5B are sequence diagrams illustrating the outline of control which is performed by the controller.

FIG. 5A illustrates a case in which the activation of cameras 1 is set to the start event. When cameras 1 are activated, that is, when power is supplied to cameras 1, controller 36 instructs moving image processor 32 to start the background image generating processing. Accordingly, moving image processor 32 starts the background image generating processing. In this case, when state information is obtained from cameras 1, it is possible to detect the activation of cameras 1.

Figure 5B:
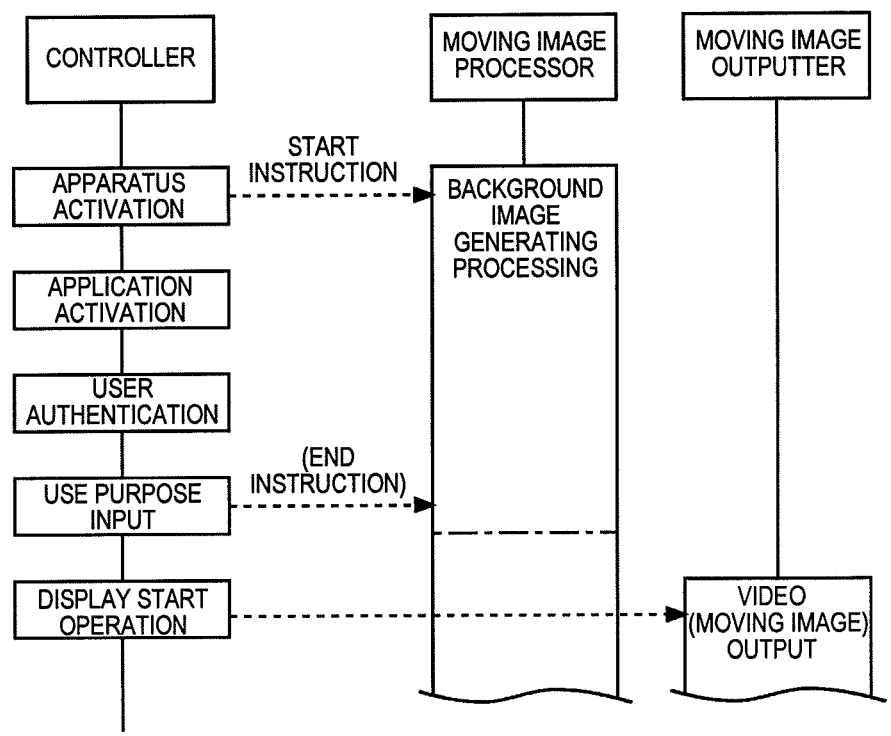

FIG. 5B illustrates a case in which the activation of PC 3 is set to the start event. When PC 3 is activated, controller 36 instructs moving image processor 32 to start the background image generating processing. Accordingly, moving image processor 32 starts the background image generating processing. In this case, when a program relevant to at least controller 36 of the monitoring application program is activated as a resident program simultaneously with the OS in PC 3, it is possible to detect the activation of PC 3.

In addition, in each of the cases of FIGS. 4A, 4B, 5A, and 5B, when the user performs the use purpose input operation and when controller 36 obtains the use purpose of the user from use purpose acquirer 35, moving image processor 32 is instructed to end the background image generating processing in the case in which the use purpose of the user does not require the mask processing, that is, in a case of the selling space monitoring, and moving image processor 32 ends the background image generating processing. When there is no instruction to end the background image generating processing, the background image generating processing which is being executed is continuously performed.

Meanwhile, in the embodiment, the user performs an operation of starting the display of video after the use purpose input operation is performed. When the operation of starting the display of video is performed, controller 36 instructs moving image outputter 33 to output one of the original (unprocessed) video, which is obtained by moving image acquirer 31, and the mask processing image, which is generated by moving image processor 32, and the original video or the mask processing image is output from moving image outputter 33 to monitor 7 according to the use purpose of the user.

In addition, in the embodiment, the user authentication is used as a processing of validating whether or not to have the authority to use the monitoring application program, and thus the user authentication is performed immediately after the application program is activated. However, the user authentication may be performed immediately after PC 3 is activated as the processing of validating whether or not to have the authority to use PC 3.

Figure 6A:
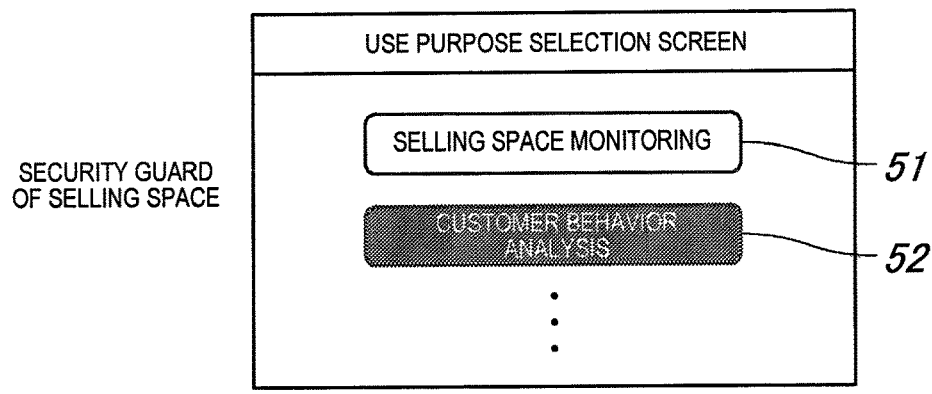
FIGS. 6A, 6B, and 6C are diagrams illustrating a use purpose selection screen which is displayed on a monitor.
Figure 6B:
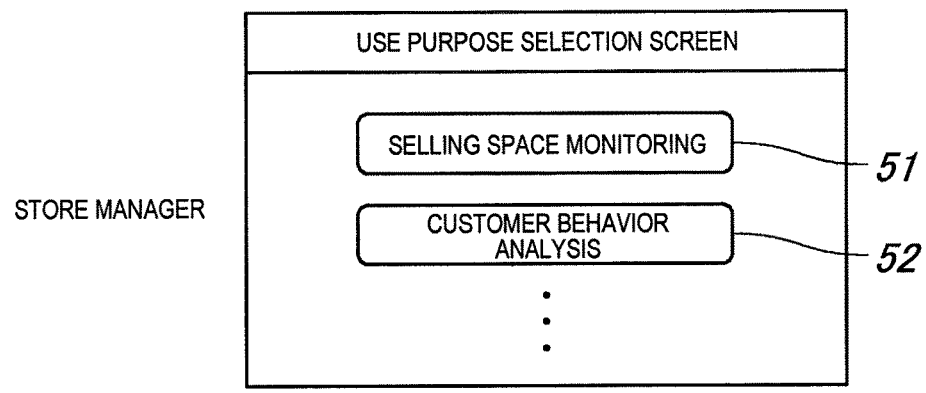
Figure 6C:
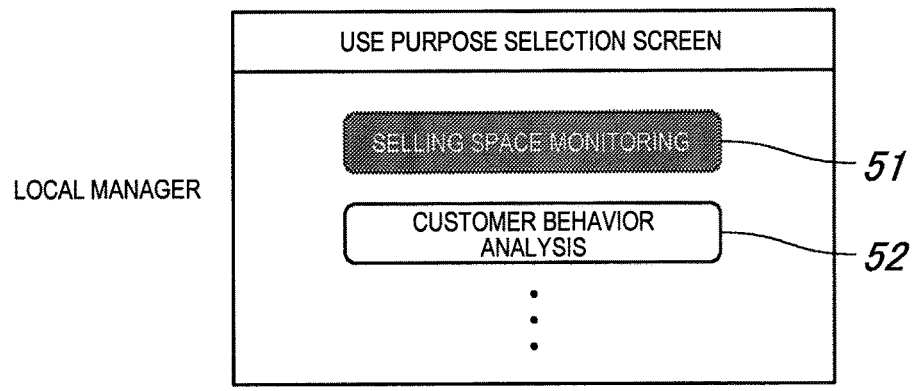

Subsequently, a processing performed by use purpose acquirer 35 shown in FIG. 3 will be described. FIGS. 6A, 6B, and 6C are explanatory diagrams illustrating the use purpose selection screen which is displayed on monitor 7.

In the embodiment, use purpose acquirer 35 performs the processing of obtaining the use purpose of the user according to the input operation performed by the user. Here, the use purpose selection screen shown in FIGS. 6A, 6B, and 6C is displayed on monitor 7. The use purpose selection screen is provided with selecting units 51 and 52 of the respective use purposes, that is, the selling space monitoring and the customer behavior analysis.

In addition, in the embodiment, when the user authentication is successful in user authenticator 34, controller 36 obtains the type of occupation (authority) of the user with reference to user management information in which the type of occupation (authority) is set for each user, a processing of limiting the option of the use purpose into a scope of business for each type of occupation according to the type of occupation of the user, and thus use purpose acquirer 35 performs a processing of causing the user to select the use purpose in the option of the use purpose which is limited by controller 36. In addition, in the embodiment, three types of occupations, that is, a security guard, a store manager, and the local manager of the selling space are set as the types of occupations of the user, and the use purpose is limited according to the types of occupations.

That is, with regard to the security guard of the selling space, the selling space monitoring is included in the scope of business but the customer behavior analysis is not included in the scope of business. Therefore, as shown in FIG. 6A, when the user is the security guard of the selling space, it is possible to select only the selling space monitoring on the displayed use purpose selection screen, and selecting unit 52 of the customer behavior analysis is displayed in a grayed out state and is in a non-selectable state. Therefore, the security guard of the selling space can select only the selling space monitoring.

In addition, with regard to the store manager, both the selling space monitoring and the customer behavior analysis are included in the scope of business. Therefore, as shown in FIG. 6B, when the user is the store manager, both selecting units 51 and 52 of the respective selling space monitoring and the customer behavior analysis are in selectable states on the displayed use purpose selection screen. Therefore, the store manager can select both the selling space monitoring and the customer behavior analysis.

In addition, with regard to the local manager, the selling space monitoring is not included in the scope of business but the customer behavior analysis is included in the scope of business. Therefore, as shown in FIG. 6C, when the user is the local manager, selecting unit 51 of the selling space monitoring is displayed in a grayed out state on the displayed use purpose selection screen and is in a non-selectable state. Therefore, the local manager can select only the customer behavior analysis.

Meanwhile, in the embodiment, the non-selectable use purpose selecting unit is displayed in a grayed out state. However, only the selectable use purpose selecting unit may be displayed on the use purpose selection screen, and the non-selectable use purpose selecting unit may not be displayed on the use purpose selection screen.

Figure 7A:
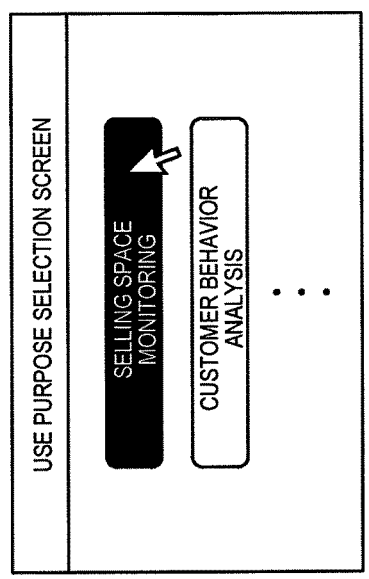
FIGS. 7A and 7B are diagrams illustrating monitoring screens which are displayed on the monitor.
Figure 7A:
Figure 7A:
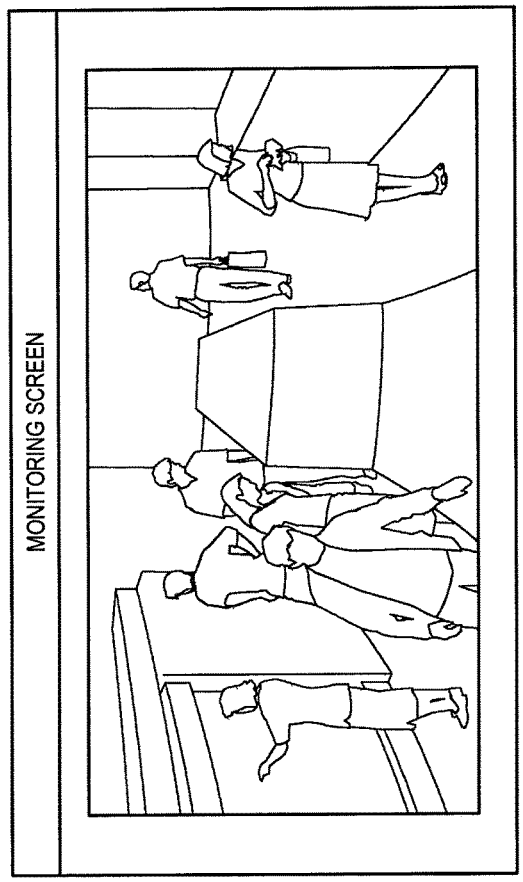
Figure 7B:
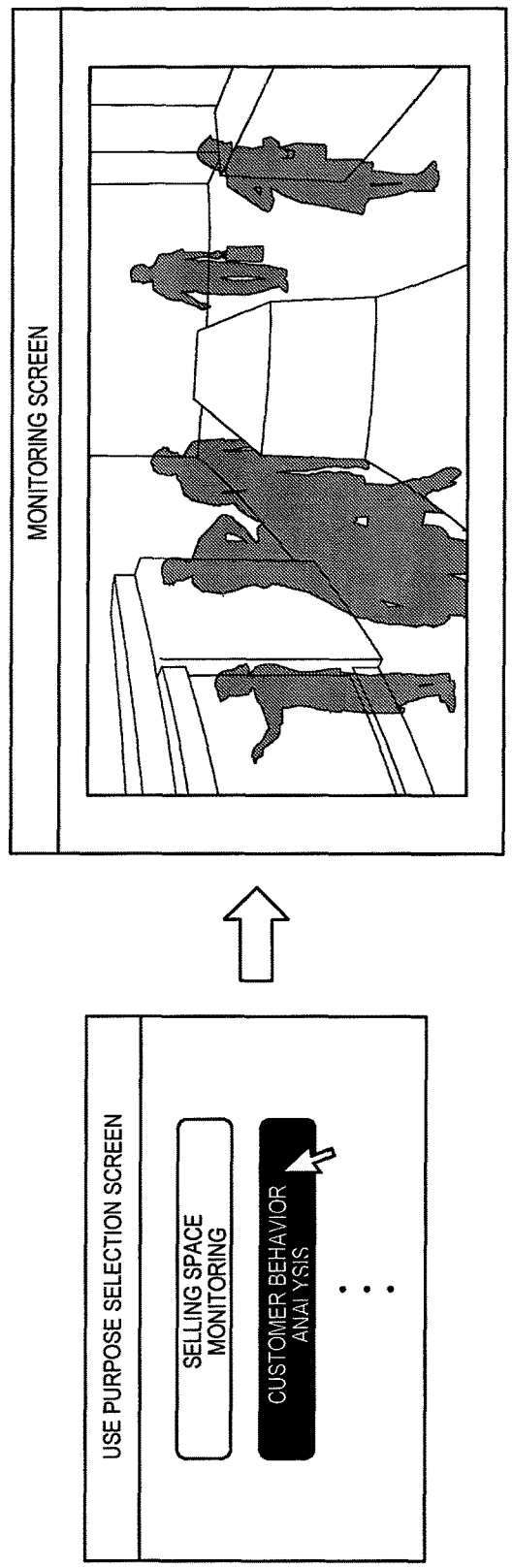

Subsequently, the processing which is shown in FIG. 3 and is performed by moving image outputter 33 will be described. FIGS. 7A and 7B are explanatory diagrams illustrating a monitoring screen which is displayed on monitor 7.

In the embodiment, controller 36 controls moving image processor 32 and moving image outputter 33 according to the use purpose of the user which is obtained by use purpose acquirer 35, and performs control such that one of the original (unprocessed) video, which is obtained by moving image acquirer 31, and the mask processing image, which is obtained by moving image processor 32, is output. Therefore, one of the original video and the mask processing image is displayed on the monitoring screen of monitor 7.

That is, when the use purpose, which is selected by the user, does not require the mask processing, more specifically, when the selling space monitoring is selected as shown in FIG. 7A, the original video, on which the mask processing is not performed, is displayed on the monitoring screen. In contrast, when the use purpose, which is selected by the user, requires the mask processing, more specifically, when the customer behavior analysis is selected as shown in FIG. 7B, the mask processing image, on which the mask processing is performed, is displayed on the monitoring screen.

Here, the use purpose selection screen shown in FIGS. 7A and 7B corresponds to a case in which the user is the store manager, and it is possible to select both the selling space monitoring and the customer behavior analysis. However, when the user is the security guard of the selling space, the use purpose is limited to the selling space monitoring, and thus it is possible to display only the original video, on which the mask processing is not performed, on the monitoring screen as shown in FIG. 7A. In contrast, when the user is the local manager, the use purpose is limited to the customer behavior analysis, and thus it is possible to display only the mask processing image, on which the mask processing is performed, on the monitoring screen as shown in FIG. 7B.

Meanwhile, in the mask processing image shown in FIG. 7B, the image area of the person is changed into the mask image in the original video shown in FIG. 7A. In addition, the mask image is displayed in the transmissible state, and thus the background image is seen through the mask processing image.

Figure 8:
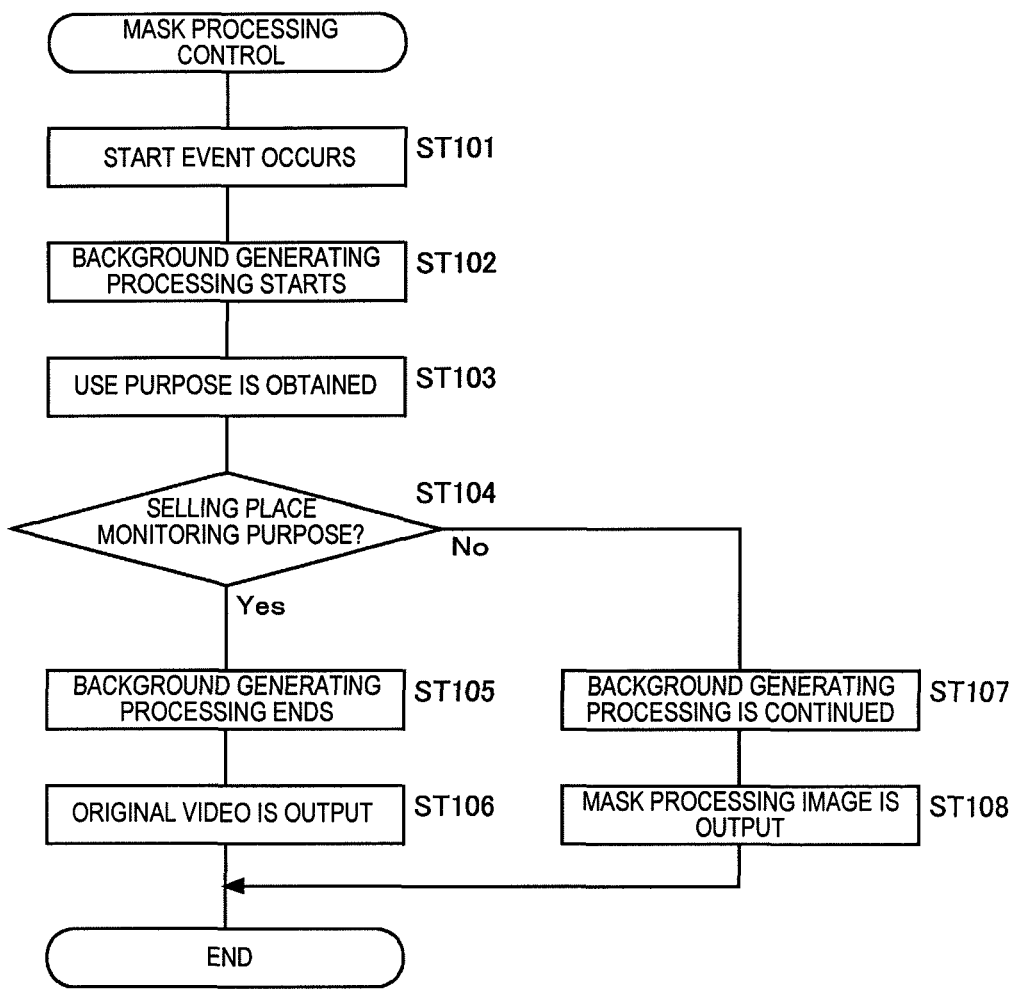
FIG. 8 is a flowchart illustrating the sequence of the control which is performed by the controller.

Subsequently, the sequence of the control which is performed by controller 36 shown in FIG. 3 will be described. FIG. 8 is a flowchart illustrating the sequence of the control which is performed by controller 36.

When it is first detected that the prescribed start event (the activation of the monitoring application program, the completion of the user authentication, or the like) occurs (ST101), controller 36 instructs moving image processor 32 to start the background image generating processing (ST102). Subsequently, the use purpose selection screen (refer to FIGS. 6A, 6B, and 6C) is displayed, and controller 36 causes use purpose acquirer 35 to perform the processing of obtaining the use purpose of the user (ST103).

Further, when the use purpose of the user is the selling space monitoring (Yes in ST104), controller 36 instructs moving image processor 32 to end the background image generating processing (ST105). Subsequently, controller 36 instructs moving image outputter 33 to output the original video (ST106). Therefore, the original video, on which the mask processing is not performed, is displayed on the monitoring screen (refer to FIG. 7A).

In contrast, when the use purpose of the user is not the selling space monitoring, that is, the use purpose of the user is the customer behavior analysis (No in ST104), the background generating processing is continued in moving image processor 32 (ST107). Further, controller 36 instructs moving image processor 32 to output the mask processing image (ST108). Therefore, the mask processing image is displayed on the monitoring screen (refer to FIG. 7B).

Figure 9:
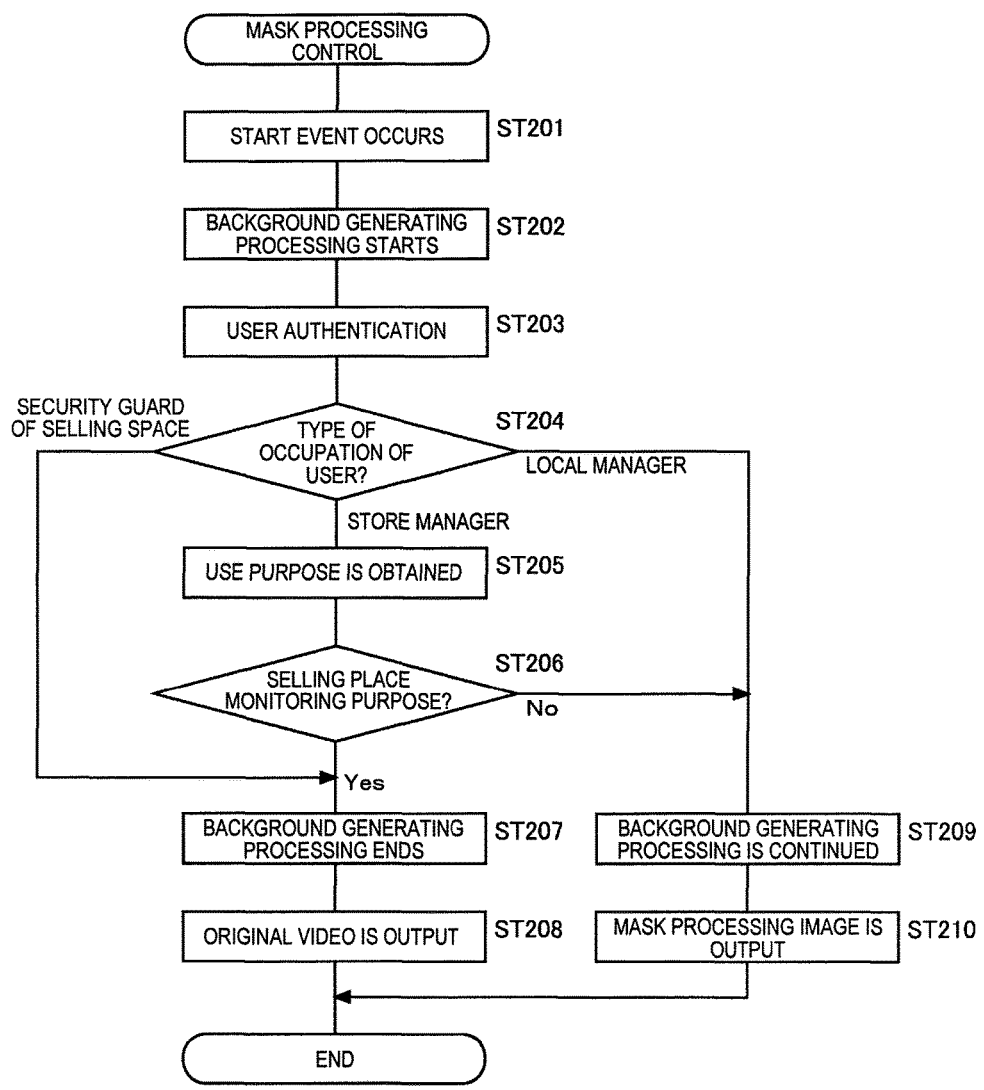
FIG. 9 is a flowchart illustrating a modified example of the sequence of the control which is performed by the controller.

Subsequently, a modified example of the sequence of the control, which is performed by controller 36 shown in FIG. 3, will be described. FIG. 9 is a flowchart illustrating a modified example of the sequence of the control which is performed by controller 36.

In the modified example, when the use purpose of the user, which is authenticated by user authenticator 34, is limited to one purpose, control is perform by controller 36 such that the processing of use purpose acquirer 35 of obtaining the use purpose according to the input operation performed by the user is omitted. That is, the use purpose of the user is limited to only the selling space monitoring when the user is the security guard of the selling space, and the use purpose of the user is limited to only the customer behavior analysis when the user is the local manager. In these cases, the use purpose input operation, which is performed by the user, is omitted.

More specifically, when it is first detected that the prescribed start event (the activation of the monitoring application program or the like) occurs (ST201), controller 36 instructs moving image processor 32 to start the background image generating processing (ST202). Subsequently, when the user authentication is performed by user authenticator 34 (ST203) and the user authentication is successful, control, which is classified according to the type of occupation of the authenticated user, is performed.

That is, when the user is the security guard of the selling space, controller 36 instructs moving image processor 32 to end the background image generating processing (ST207). Subsequently, controller 36 instructs moving image outputter 33 to output the original video (ST208). Therefore, the original video, on which the mask processing is not performed, is displayed on the monitoring screen (refer to FIG. 7A).

In contrast, when the user is the local manager, the background generating processing is continued by moving image processor 32 (ST209). Further, controller 36 instructs moving image processor 32 to output the mask processing image (ST210). Therefore, the mask processing image is displayed on the monitoring screen (refer to FIG. 7B).

In addition, when the user is the store manager, the use purpose selection screen (refer to FIG. 6B) is displayed, and controller 36 causes use purpose acquirer 35 to perform the processing of obtaining the use purpose of the user (ST205).

Further, when the use purpose of the user is the selling space monitoring (Yes in ST206), controller 36 instructs moving image processor 32 to end the background image generating processing (ST207) and instructs moving image outputter 33 to output the original video (ST208), similarly to the case of the security guard of the selling space. Therefore, the original video is displayed on the monitoring screen (refer to FIG. 7A).

In contrast, when the use purpose of the user is not the selling space monitoring, that is, the use purpose of the user is the customer behavior analysis (No in ST206), the background generating processing is continued by moving image processor 32 (ST209) and controller 36 instructs moving image outputter 33 to output the mask processing image (ST210), similarly to the case of the store manager. Therefore, the mask processing image is displayed on the monitoring screen (refer to FIG. 7B).

Meanwhile, in the example shown in FIG. 9, the start event occurs before the user authentication is performed. However, the completion of the user authentication may be set to the start event. In this case, controller 36 instructs moving image processor 32 to start the background image generating processing according to the completion of the user authentication.

As described above, in the embodiment, use purpose acquirer 35 obtains the use purpose of the user according to the input operation performed by the user, moving image processor 32 performs the mask processing of changing the entirety or a part of the image area of the person (movable body) in the video into the mask image, thereby generating the mask processing image, moving image outputter 33 selectively outputs the video and the mask processing image, and controller 36 controls moving image processor 32 and moving image outputter 33 according to the use purpose of the user such that one of the original video and the mask processing image is output. More specifically, controller 36 causes moving image processor 32 to start the prescribed preprocessing according to the prescribed start event generated in advance to the use purpose input operation, which is performed by the user. In this manner, controller 36 causes moving image processor 32 to start the prescribed preprocessing according to the prescribed start event without the use purpose input operation, which is performed by the user, and thus it is possible to eliminate the display delay which is generated when the display of video starts. Therefore, after the user performs the use purpose input operation, it is possible to immediately display an appropriate video according to the use purpose regardless of the use purpose.

In addition, in the embodiment, when the use purpose input operation is performed by the user and when the use purpose of the user requires the mask processing, controller 36 causes the preprocessing to be continued and, when the use purpose of the user does not require the mask processing, controller 36 causes preprocessing to end. Therefore, it is possible to prevent the load of a device from increasing due to useless processing.

In addition, in the embodiment, background image generator 41 of moving image processor 32 generates a background image from video during the nearest prescribed learning period, person area acquirer (moving object area acquirer) 42 obtains the position information of the image area of the person (movable body) in the video based on the video and the background image, mask image generator 43 generates the mask image corresponding to the image area of the person, mask processing image generator 44 generates the mask processing image by superimposing the mask image on the background image, and controller 36 causes the background image generator to start the background image generating processing as the preprocessing according to the start event. In this manner, it is possible to precisely obtain the position information of the image area of the person by generating the background image from the nearest video based on the fact that video momentarily changes according to the change in light from outside, and thus it is possible to generate appropriate mask processing image. Further, it is necessary to secure a sufficiently long learning period in order to generate the appropriate background image using the background image generating processing, and thus the display delay, which is generated when the display of video starts, is remarkable. However, it is possible to eliminate display delay by starting the background image processing as the preprocessing.

In addition, in the embodiment, controller 36 causes moving image processor 32 to start the preprocessing according to the activation of the device as the start event, with the result that it is possible to secure time from when the device is activated to when the user performs the use purpose input operation, and thus it is possible to eliminate the display delay which is generated when the display of video starts.

In addition, in the embodiment, user authenticator 34 performs the user authentication, controller 36 causes moving image processor 32 to start the preprocessing according to the completion (success) of the user authentication, which is performed by user authenticator 34, as the start event, with the result that it is possible to secure time from when the user authentication is performed to when the user performs the use purpose input operation, and thus it is possible to eliminate the display delay which is generated when the display of video starts.

In addition, in the embodiment, when user authenticator 34 performs the user authentication and when the use purpose of the user, which is authenticated by user authenticator 34, is limited to one purpose, controller 36 performs control such that the process, which is performed by use purpose acquirer 35, is omitted, with the result that the use purpose input operation, which is performed by the user, is omitted, and thus it is possible to increase the convenience of the user.

In addition, in the embodiment, controller 36 causes moving image processor 32 to start the preprocessing according to the activation of cameras 1 as the start event, and it is possible to secure the time until when the user performs the use purpose input operation after cameras 1 are activated. Therefore, it is possible to eliminate the display delay which is generated when the display of video starts.

In addition, in the embodiment, the respective steps for monitoring are performed by the monitoring application program which is introduced to an information processing device, and the preprocessing is caused to start according to the activation of the application program as the start event. Therefore, it is possible to secure the time until when the user performs the use purpose input operation after the application program is activated, and thus it is possible to eliminate the display delay which is generated when the display of video starts.

Second Embodiment

Subsequently, a second embodiment will be described. Meanwhile, the facts which are not particularly mentioned here are the same as in the first embodiment.

Figure 10:
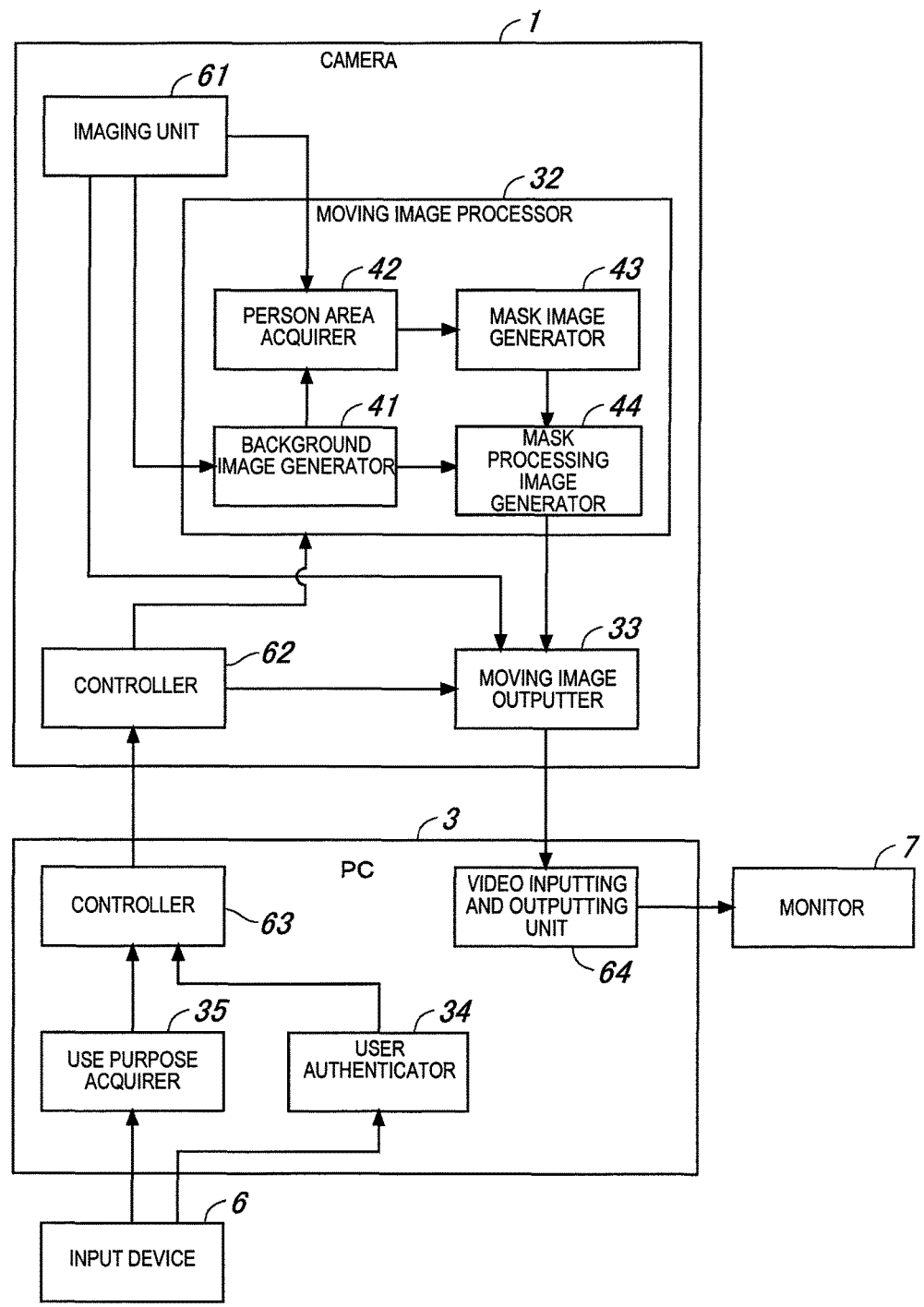
FIG. 10 is a functional block diagram illustrating the schematic configuration of a camera and a PC in a monitoring system according to a second embodiment.

FIG. 10 is a functional block diagram illustrating the schematic configuration of camera 1 and PC 3 in a monitoring system according to the second embodiment. In the second embodiment, moving image processor 32 and moving image outputter 33, which are provided in PC 3 in the first embodiment, are provided in camera 1.

Camera 1 is provided with imaging unit 61 which includes an imaging element and a light emitting element. Moving image processor 32 performs a processing of generating mask processing image by performing a mask processing on video which is output from imaging unit 61. Moving image outputter 33 performs a processing of selectively outputting original video, which is output from imaging unit 61, and the mask processing image, which is obtained by moving image processor 32, according to an instruction from controller 62. Further, the selected and output video is displayed on the monitoring screen (refer to FIGS. 7A and 7B) of monitor 7 through video inputting and outputting unit 64 of PC 3.

In contrast, PC 3 is provided with user authenticator 34 and use purpose acquirer 35. Processes, which are performed by user authenticator 34 and use purpose acquirer 35, are the same as in the first embodiment. The use purpose of a user is obtained according to the input operation performed by the user using input device 6, such as a mouse and a keyboard, and the user authentication is performed. Controller 63 obtains the type of occupation (authority) of the user based on a user ID, which is obtained from user authenticator 34, and use purpose acquirer 35 performs a processing of obtaining the use purpose of the user in a state in which the use purpose is limited according the type of occupation of the user.

The use purpose of the user, which is obtained by use purpose acquirer 35 of PC 3, is transmitted to controller 62 of camera 1, and controller 62 of camera 1 controls moving image processor 32 and moving image outputter 33 according to the use purpose of the user, which is obtained from PC 3, and performs control such that one of the original video and the mask processing image is output.

As described above, although the present invention has been described based on the specific embodiments, the embodiments are only examples and the present invention is not limited to the embodiments. In the embodiments, the mask processing is described as an example of a processing which is influenced by the background image generating time, the processing can be applied to other processes. For example, even when an intruder detecting process, an attendance detecting process, a substance detecting process, or the like is performed using a background difference manner, an appropriate background image, in which a person is not reflected, is necessary. Therefore, similarly to the embodiments, it is possible to eliminate the display delay, which is generated when the display of various processing video starts, by starting the prescribed preprocessing according to the prescribed start event. In addition, all of the respective components of the monitoring device, the monitoring system, and the monitoring method, which are described in the embodiments according to the present invention, are not necessarily essential, and can be appropriately selected without departing from at least the scope of the present invention.

For example, in the respective embodiments, an example of a retail store, such as a convenience store, is described. However, the present invention is not limited to the retail store and can be applied to a store, for example, a restaurant or a bank, which has a business form other than the retail store. Further, the present invention can be applied for the use of a monitoring area, other than the store, as a target.

In addition, in the respective embodiments, an example, in which a movable body which is the target of the mask processing is a person, is described. However, the mask processing may be performed while a movable body other than the person, for example, a vehicle, such as an automobile or a bicycle, may be used as a target.

In addition, in the respective embodiments, camera 1 is set to an omnidirectional camera, which has a 360-degree capturing range, using a fish-eye lens as shown in FIG. 2. However, camera 1 may be a camera, so-called a box camera, which has a prescribed angle of view.

In addition, in the respective embodiments, the preprocessing, which starts according to the start event, is the background image generating processing which is performed by background image generator 41. However, the preprocessing is not limited to the background image generating processing and a process, which is the cause of the display delay, may appropriately start as the preprocessing according to the mask processing method. In addition, the preprocessing may start, for example, all of the processes which are performed by moving image processor 32.

In addition, in the respective embodiments, it is possible to select one of the selling space monitoring and the customer behavior analysis as the use purpose of the user. However, the use purpose of the user is not limited thereto and the use purpose of the user may be divided based on whether or not the mask processing is necessary. For example, a use purpose, such as selling space analysis, is added, only the background image is updated such that a mask image, which is superimposed on the background image, is not displayed, and it is possible to set the browsing of the display conditions of products which are reflected in the background to the use purpose. In addition, in the respective embodiments, three types of occupations, that is, the security guard of the selling space, the store manager, and the local manager, are set to the types of occupations of the user. However, the type of occupation of the user is not limited thereto and may be appropriately set according to the presence or absence of the authority for browsing the original video on which the mask processing is not performed.

In addition, in the first embodiment, the processing which is necessary for monitoring is caused to be performed by PC 3 which is provided in the store. However, the necessary processing may be caused to be performed by PC 11 which is provided at the head office or cloud computer 12 which forms a cloud computing system as shown in FIG. 1. In addition, the necessary processing may be shared by a plurality of information processing devices, and information may be exchanged between the plurality of information processing devices through a communication medium such as an IP network or a LAN. In this case, the monitoring system is formed by the plurality of information processing devices which share the necessary processing.

In such a configuration, in the processing which is necessary for monitoring, at least a processing which requires a large amount of operation, for example, a person detection processing, may be caused to be performed by a device, such as PC 3, which is provided in the store. In such a configuration, the amount of data of information which is necessary for a remaining processing is small. Therefore, when the remaining processing is caused to be performed by an information processing device, which is installed in a different place from the store, for example, by PC 11, which is installed in the head office, it is possible to reduce communication loads, and thus it is easy to operate a system depending on a wide area network connection.

In addition, in the processing which is necessary for monitoring, at least a processing which requires a large amount of operation, for example, a person detection processing, may be caused to be performed by, cloud computer 12. In such a configuration, the amount of operation for the remaining processing is small. Therefore, a high-speed information processing device is not necessary on the side of the user, such as a store, and thus it is possible to reduce cost which is burden to the user.

In addition, cloud computer 12 may be caused to perform all of the necessary process, or cloud computer 12 may be caused to share at least the video outputting processing of the necessary processing. In such a configuration, a portable terminal, such as smart phone 13 or tablet terminal 14, can display video in addition to PC 3 or PC 11 which is provided in the store or the head office, and thus it is possible to recognize the situation in the store at an arbitrary place, such as a visiting destination, in addition to the store and the head office.

In addition, in the embodiments, a case, in which necessary input and output are performed using PC 3 by causing PC 3 which is installed in the store to perform the processing which is necessary for monitoring and by causing monitor 7 of PC 3 to display the use purpose selection screen or the monitoring screen, is described. However, necessary input and output may be performed using another information processing device, for example, a portable terminal, such as PC 11 or tablet terminal 14, which is installed at the head office, in addition to the information processing device which performs the processing necessary for monitoring.

More specifically, in the embodiments, the security guard of the selling space, the store manager, and the local manager browse the video. The store manager may perform necessary input and output using PC 3 which is installed in the store. However, the local manager belongs to the head office, and there is a case in which the security guard of the selling space is assigned to the store or assigned to the head office. In this case, it is necessary to make a configuration such that it is possible to perform necessary input and output using PC 11 which is installed in the head office.

In addition, in recent years, a 4K television, in which high resolution is investigated, or the like is developed as a monitor. When a camera corresponding to the 4K television is used, it is possible to increase person identification performance, and thus the user can easily understand the behavior of a person from mask reproduction video even under an environment in which there is a plurality of people.

The monitoring device, the monitoring system, and the monitoring method according to the present invention have an advantage in which it is possible to immediately display an appropriate video according to the use purpose after the user performs the use purpose input operation regardless of the use purpose, and are useful as the monitoring device, the monitoring system, and the monitoring method which generate the mask processing image obtained by changing the image area of the movable body of the video in the monitoring area into the mask image, and which output one of the original video and the mask processing image according to the use purpose of the user.

What is claimed is:

1. A monitoring device, which generates a mask processing image, obtained by changing an image area of a movable body of a video in a monitoring area into a mask image, and which outputs one of an original video and the mask processing image according to a purpose of use of a user, the monitoring device comprising:
    a processor;
    a controller;
    a moving image processor; and
    a memory that stores instructions that, when executed by the processor, cause the processor to perform operations including:
        obtaining the purpose of use of the user according to a purpose of use input operation performed by the user;
        generating, by the moving image processor, the mask processing image by performing a mask processing of changing an entirety or a part of the image area of the movable body of the video into the mask image;
        selectively outputting the video and the mask processing image; and
        controlling, by the controller, the moving image processor and the selectively outputting according to the purpose of use of the user, and outputting one of the original video and the mask processing image,
    wherein the controller causes the moving image processor to start a prescribed preprocessing according to a prescribed start event generated in advance of the purpose of use input operation, which is performed by the user, and
    wherein the purpose of use is chosen from a list generated on a display of the monitoring device.

2. The monitoring device of claim 1,
    wherein, if the purpose of use input operation is performed by the user, the controller continues the preprocessing when the purpose of use of the user requires the mask processing, and ends the preprocessing when the purpose of use of the user does not require the mask processing.

3. The monitoring device of claim 1,
    wherein the moving image processor includes:
        a background image generator that generates a background image from the video during a nearest prescribed learning period;
        a moving object area interface that obtains position information of the image area of the movable body of the video based on the video and the background image;
        a mask image generator that generates the mask image corresponding to the image area of the movable body; and
        a mask processing image generator that generates the mask processing image by superimposing the mask image on the background image, wherein the controller causes the background image generator to start a background image generating processing as the preprocessing according to the start event.

4. The monitoring device of claim 1,
wherein the controller causes the moving image processor to start the preprocessing according to activation of the monitoring device as the start event.

5. The monitoring device of claim 1, further comprising:
a user authenticator that performs user authentication,
wherein the controller causes the moving image processor to start the preprocessing according to completion of the user authentication performed in the user authenticator as the start event.

6. The monitoring device of claim 1, further comprising:
a user authenticator that performs user authentication,
wherein the controller performs control such that the obtaining performed by the processor is omitted when the purpose of use of the user, which is authenticated by the user authenticator, is limited to one purpose.

7. A monitoring system, which generates a mask processing image, obtained by changing an image area of a movable body of a video in a monitoring area into a mask image, and which outputs one of an original video and the mask processing image according to a purpose of use of a user, the monitoring system comprising:
a camera that captures the monitoring area; and
a plurality of information processing devices,
wherein any one of the plurality of information processing devices includes
a processor;
a memory that stores instructions;
a purpose of use interface that obtains the purpose of use of the user according to a purpose of use input operation performed by the user;
a moving image processor that generates the mask processing image by performing a mask processing of changing an entirety or a part of the image area of the movable body of the video into the mask image;
a moving image output interface that selectively outputs the video and the mask processing image; and
a controller that controls the moving image processor and the moving image output interface according to the purpose of use of the user, and outputs one of the original video and the mask processing image,
wherein the purpose of use interface, the moving image processor, the moving image output interface, and the controller correspond to the instructions which are stored in the memory and performed by the processor,
wherein the controller causes the moving image processor to start a prescribed preprocessing according to a prescribed start event generated in advance of the purpose of use input operation, which is performed by the user, and
wherein the purpose of use is chosen from a list generated on a display of the monitoring system.

8. The monitoring system of claim 7,
wherein the controller causes the moving image processor to start the preprocessing according to activation of the camera as the start event.

9. A monitoring system, which generates a mask processing image, obtained by changing an image area of a movable body of a video in a monitoring area into a mask image, and which outputs one of an original video and the mask processing image according to a purpose of use of a user, the monitoring system comprising:
a camera that captures the monitoring area; and
an information processing device that includes a processor, and a memory that stores instructions,
wherein the information processing device includes
a purpose of use interface that obtains the purpose of use of the user according to a purpose of use input operation performed by the user,
wherein the camera includes:
a moving image processor that generates the mask processing image by performing a mask processing of changing an entirety or a part of the image area of the movable body of the video into the mask image;
a moving image output interface that selectively outputs the video and the mask processing image; and
a controller that controls the moving image processor and the moving image output interface according to the purpose of use of the user, and outputs one of the original video and the mask processing image,
wherein the controller causes the moving image processor to start a prescribed preprocessing according to a prescribed start event generated in advance of the purpose of use input operation, which is performed by the user, and
wherein the purpose of use is chosen from a list generated on a display of the monitoring system.

10. The monitoring system of claim 9,
wherein the controller causes the moving image processor to start the preprocessing according to activation of the camera as the start event.

11. A monitoring method causing an information processing device to perform a processing of generating a mask processing image, obtained by changing an image area of a movable body of a video in a monitoring area into a mask image, and outputting one of an original video and the mask processing image according to a purpose of use of a user, the monitoring method comprising:
obtaining the purpose of use of the user according to a purpose of use input operation performed by the user;
generating the mask processing image by performing a mask processing of changing an entirety or a part of the image area of the movable body of the video into the mask image;
outputting one of the original video and the mask processing image according to the purpose of use of the user;
starting a prescribed preprocessing relevant to a mask processing image generating processing according to a prescribed start event generated in advance of the purpose of use input operation which is performed by the user; and
monitoring a list of the purpose of use to be chosen,
wherein the obtaining, generating, outputting, starting, and monitoring corresponds to instructions which are stored in a memory and which are performed by a processor of the information processing device.

12. The monitoring method of claim 11,
wherein the obtaining, generating, outputting, and starting are performed by a monitoring application program which is introduced in the information processing device, and
wherein the preprocessing starts according to activation of the application program as the start event.

* * * * *